US008741997B2

(12) United States Patent
Mongoin et al.

(10) Patent No.: US 8,741,997 B2
(45) Date of Patent: Jun. 3, 2014

(54) USE OF AMPHIPHILIC COPOLYMERS AS AGENTS FOR IMPROVING THE THERMAL STABILITY AND UV RESISTANCE OF CHLORINATED AND FILLED THERMOPLASTIC MATERIALS, PROCESS FOR THE FABRICATION OF THE SAID MATERIALS

(75) Inventors: Jacques Mongoin, Quincieux (FR); Renaud Souzy, Caluire et Cuire (FR); Patrick A. C. Gane, Rothrist (CH); Matthias Buri, Rothrist (CH)

(73) Assignee: Omya International AG, Oftringen (CH)

( * ) Notice: Subject to any disclaimer, the term of this patent is extended or adjusted under 35 U.S.C. 154(b) by 180 days.

(21) Appl. No.: 13/513,027

(22) PCT Filed: Dec. 6, 2010

(86) PCT No.: PCT/IB2010/003116
§ 371 (c)(1),
(2), (4) Date: Aug. 2, 2012

(87) PCT Pub. No.: WO2011/070423
PCT Pub. Date: Jun. 16, 2011

(65) Prior Publication Data
US 2012/0322930 A1 Dec. 20, 2012

Related U.S. Application Data

(60) Provisional application No. 61/287,215, filed on Dec. 17, 2009.

(30) Foreign Application Priority Data

Dec. 7, 2009 (FR) ...................... 09 05901

(51) Int. Cl.
*C08K 3/34* (2006.01)
*C08K 3/26* (2006.01)
*C08F 14/02* (2006.01)
*C08L 27/00* (2006.01)

(52) U.S. Cl.
USPC ........... 524/427; 524/300; 524/425; 524/447; 524/451; 524/519; 524/522

(58) Field of Classification Search
CPC ......... C08L 33/00; C08L 33/02; C08L 33/04; C08L 27/04; C08L 27/06
USPC ......... 524/502, 505, 519, 522, 300, 425, 427, 524/447, 451
See application file for complete search history.

(56) References Cited

U.S. PATENT DOCUMENTS

2007/0072979 A1* 3/2007 Moad et al. .................. 524/445

FOREIGN PATENT DOCUMENTS

| WO | 2007052122 A1 | 5/2007 |
| WO | 2008053296 A2 | 5/2008 |
| WO | 2008107787 A1 | 9/2008 |

OTHER PUBLICATIONS

International Search Report, dated Mar. 18, 2011 for PCT Application No. PCT/IB2010/003116.
Written Opinion of the International Authority, dated Mar. 18, 2011 for PCT Application No. PCT/IB2010/003116.

* cited by examiner

*Primary Examiner* — Vu A Nguyen
(74) *Attorney, Agent, or Firm* — Amster, Rothstein & Ebenstein LLP

(57) ABSTRACT

The present invention consists of the use, in a chlorinated and filled thermoplastic composition containing at least one chlorinated thermoplastic resin and at least one mineral filler, as an agent improving the thermal stability and UV resistance of the said composition, of a linear amphiphilic copolymer characterized in that:
  it consists of at least one hydrophilic monomer and at least one hydrophobic monomer,
  it has an average molar mass by weight of between 5,000 g/mol and 20,000 g/mol and a polymolecularity index less than or equal to 3, and preferentially an average molar mass by weight of between 10,000 g/mol and 15,000 g/mol, and a polymolecularity index less than or equal to 2.5.
It also concerns a manufacturing process for a chlorinated and filled thermoplastic composition implementing the said copolymer, as well as the composition obtained directly by the said process.

24 Claims, No Drawings

USE OF AMPHIPHILIC COPOLYMERS AS AGENTS FOR IMPROVING THE THERMAL STABILITY AND UV RESISTANCE OF CHLORINATED AND FILLED THERMOPLASTIC MATERIALS, PROCESS FOR THE FABRICATION OF THE SAID MATERIALS

CROSS-REFERENCE TO RELATED APPLICATIONS

This application is a U.S. National phase of PCT Application No. PCT/IB2010/003116, filed Dec. 6, 2010, which claims priority to French Application No. 0905901, filed Dec. 7, 2009 and U.S. Provisional Application No. 61/287,215, filed Dec. 17, 2009.

The present invention relates to the sector of chlorinated thermoplastic materials containing a mineral filler. It concerns a compatibilizer between the filler and the resin which has the dual function of improving the thermal stability and UV resistance of the final material.

Chlorinated thermoplastic materials, and in particular those based on PVC, have many applications such as the fabrication of pipes (water supply, sanitation, irrigation, ducting for the passage of cables) exterior and/or interior construction materials (window frames, shutters, doors, siding, false ceilings) or industrial parts.

They contain a mineral filler such as talc, alumina, titanium dioxide, magnesium oxide, barium sulphate, aluminium, silica, kaolin or natural or synthetic calcium carbonate, fillers that are listed in document JP 50-028105 describing rigid materials obtained from a mixture of one or more of these fillers with PVC.

Calcium carbonate is a preferred filler for chlorinated thermoplastic materials, since it enables an improvement in some of their physical properties such as their rigidity, their cooling time during extrusion or their die build-up. This is reported in the document "The use of calcium carbonate to enhance the physical properties of rigid vinyl products" (Society of Plastic Engineering, Conf., Oct. 12-14, 1999).

According to the basic knowledge of the person skilled in the art, the resin that makes up these materials is a hydrophobic environment in which calcium carbonate disperses poorly: this means that the grains of mineral material are not dispersed in a natural and homogeneous manner in the said resin. This poor distribution or this poor state of dispersion, or again this poor compatibility results in a degradation of the mechanical and optical properties of the final composition.

Also, the person skilled in the art has developed methods for the processing of calcium carbonate in order to improve its compatibility with thermoplastic resins in general, and chlorinated thermoplastic resins such as PVC in particular. Documents FR 1 047 087, WO 00/20336 and U.S. Pat. No. 4,151,136 describe the surface treatment of calcium carbonate with waxes and fatty acids with from 8 to 22 carbon atoms. Stearic acid and its salts are commonly employed today: applications of it are found in documents WO 02/55596, WO 04/09711 and WO 01/32787.

To stimulate or exacerbate the effect of stearin, the person skilled in the art has developed special polymeric structures that are said to be weakly anionic and of the comb type. Through this expression there has been developed a copolymer consisting of an essentially linear skeleton and of a (meth)acrylic type to which are grafted at least 2 lateral segments consisting of at least one "macromonomer" of the polyalkylene oxide type.

Documents WO 2007/052122 and WO 2008/053296 demonstrate the beneficial influence of such polymers on the resistance to impact and the gloss of a filled PVC composition, properties known to constitute direct proof of improved compatibility of the filler with the resin. This link has been established specifically in the publications "Study on ground calcium carbonate and wollastonite composite fillers filling properties and reinforcement mechanisms" (Zhongguo Fenti Jishu, 2002, 8 (1), pp. 1-5), "Recycling of incompatible plastics with reactive compatibilizers" (Special Publication—Royal Society of Chemistry, 1997, 199 Chemical Aspects of Plastics Recycling, pp. 170-179) and "Labor-saving method of testing the dispersibility of titanium dioxide Pigments" (FATIPEC Congress (1988), Vol. III (19th), 307-19).

Among the comb structures previously described, the Applicant has recently identified a particularly advantageous family of polymers since, apart from their ability to enhance the compatibility of the mineral filler with the resin, they improve the thermal stability of the final composition, a fundamental property when it is known that this composition is intended to be subjected to transformation operations by extrusion, injection, pressing, moulding such as injection moulding or calendering at high temperatures (over 150° C.). The polymers in question are characterized by the simultaneous presence of 2 groups of ethylene oxide and propylene oxide on the side-chain. This constitutes the subject of the not yet disclosed French patent application filing bearing the application number FR 08 58748.

But these latter structures do not yet provide complete satisfaction. Indeed, it was observed that the filled compositions turned pink when they were subjected to high temperatures or UV rays. This phenomenon generates a more or less marked pink coloration on the surface of the composition which creates a problem of aesthetics for the end user.

Also, looking for a technical solution to maintain good compatibility between the mineral filler and the chlorinated resin in which it is introduced, while improving the thermal stability of the said composition and its resistance to UV, the Applicant has perfected the use of certain linear amphiphilic copolymers presenting a certain polymolecularity index for a given molecular weight. In addition to their ability to make the filler compatible with the resin in which it is introduced, these polymers have the function of an agent for improving the thermal stability and UV resistance of the final composition.

The results obtained with such structures prove to be particularly interesting:
- a good state of dispersion of the filler in the resin is maintained: this property is directly related to an improvement in optical properties (gloss) and mechanical properties (impact resistance) of the filled composition,
- the thermal stability of the filled composition is improved, as measured by the CHD (Case Hardness Depth) or by means of gelling curves,
- the UV resistance of the said filled composition is improved, thereby reducing the phenomenon of pinking, as demonstrated by measurements of whiteness after exposure to direct UV radiation or after heat treatment, and this with respect to the filled composition:
- not containing any compatibilizer other than stearic acid,
- containing in addition stearic acid a compatibilizer of the comb type, as revealed by the prior art,
- containing in addition to the stearic acid a compatibilizer of the amphiphilic but non-linear type and/or which does not present the characteristics of molecular weight and the polymolecularity index of the present invention.

Also, a first object of the invention consists of the use, in a chlorinated and filled thermoplastic composition containing at least one chlorinated thermoplastic resin and at least one mineral filler as an agent improving the thermal stability and UV resistance of the said composition, of a linear amphiphilic copolymer characterized in that:

it consists of at least one hydrophilic comonomer and at least one hydrophobic comonomer, it has an average molar mass by weight of between 5,000 g/mol and 20,000 g/mol and a polymolecularity index less than or equal to 3, and preferentially an average molar mass by weight of between 10,000 g/mol and 15,000 g/mol, and a polymolecularity index less than or equal to 2.5.

By linear, the Applicant means that the amphiphilic copolymer is essentially linear, i.e., that it may include a minor amount of random branching resulting from free radical polymerization.

This use is also characterized in that the said linear amphiphilic copolymer contains, in molar percentage of each comonomer, between 60% and 95% of hydrophilic comonomer and 5% to 40% of hydrophobic comonomer, preferentially between 70% and 90% of hydrophilic comonomer and 10% to 30% of hydrophobic comonomer.

This use is also characterized in that the hydrophilic comonomer is chosen from among acrylic acid, methacrylic acid and blends of these comonomers.

This use is also characterized in that the hydrophobic comonomer is chosen from among the styrenes and the alkyl acrylates and blends thereof, including specifically butyl styrene and butyl acrylate.

This use is also characterized in that the said linear amphiphilic copolymer has a random structure or a block structure.

As such, the copolymer used according to the invention is obtained by the copolymerization of acrylic and/or methacrilic acid with hydrophobic comonomers such as butyl acrylate or styrene. It was synthesized exclusively in water by controlled free radical polymerization using a particular chain transfer agent which is a salt of the propionic acid of 2,2'-[carbonothioylbis(thio)]bis, and in particular its sodium salt (No. CAS 864970-33-2). The general formula of this salt is as follows:

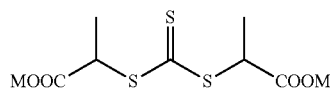
(I)

With M designating the hydrogen atom, an amine salt, ammonium or an alkali cation, and more preferentially, the sodium cation.

This copolymer obtained in the acid form can also be partially or totally neutralized by one or more neutralizing agents having a monovalent or polyvalent cation, the said agents being preferentially selected from among ammonia or among the hydroxides and/or the oxides of calcium, magnesium, or from among the hydroxides of sodium, potassium, lithium, and preferentially in that the neutralizing agent is sodium hydroxide.

The said copolymer can optionally, before or after neutralization, be processed and separated into several phases, according to random or dynamic methods known to the person skilled in the art, by one or more polar solvents belonging notably to the group comprised of water, methanol, ethanol, propanol, isopropanol, the butanols, acetone, tetrahydrofuran or blends thereof. One of the phases is the polymer used according to the invention.

According to another variant, the said copolymer can also be dried.

This use is also characterized in that the chlorinated and filled thermoplastic composition contains, in relation to its total weight:

(a) from 0.1 to 99% by dry weight of at least one chlorinated thermoplastic resin, (b) from 0.1 to 90%, preferentially from 5 to 50% by dry weight of at least one mineral filler.

(c) from 0.01 to 5%, preferentially from 0.1 to 3% by dry weight of the said linear amphiphilic copolymer, (d) from 0 to 20%, preferentially from 5 to 20% by dry weight of a heat stabilizer and/or a UV stabilizer and/or a lubricant and/or a rheology modifier and/or an impact modifier and/or a processability agent that is not the said amphiphilic copolymer, (e) from 0 to 3%, preferentially from 0 to 1%, very preferentially from 0 to 0.5%, extremely preferentially from 0 to 0.2% by dry weight with respect to the dry weight of the mineral filler, of a compatibilizer other than the said amphiphilic copolymer, this compatibilizer being preferentially a fatty acid with from 8 to 20 carbon atoms, the said acid being preferentially selected from stearic acid and its salts.

This use is also characterized in that the chlorinated thermoplastic resin is chosen from among PVC, chlorinated polyvinyl chloride (CPVC), chlorinated polyethylene, copolymers of the PVC-polyvinyl acetate (PVC-PVAC) type and blends thereof.

This use is also characterized in that the mineral filler is chosen from among natural or synthetic calcium carbonate, the dolomites, limestone, kaolin, talc and blends thereof, and is a preferentially a natural or synthetic calcium carbonate.

This use is also characterized in that the said linear amphiphilic copolymer is being implemented in a grinding step of the said mineral filler, the said grinding being a dry grinding or a wet grinding step followed by a drying, and preferentially is implemented during a wet grinding of the said mineral filler followed by a drying.

This use is also characterized in that the said mineral filler has an average diameter measured by a Sedigraph™ 5100 of between 0.5 and 5 µm, and preferentially between 0.6 µm and 1.5 µm.

This use is also characterized in that the said mineral filler has a percentage by weight of particles with a diameter less than 2 µm, as measured by a Sedigraph™ 5100 ranging between 10% and 99%, preferentially between 50% and 95%, and more preferentially between 60% and 90%.

This use is also characterized in that the chlorinated and filled thermoplastic composition is formed by a process implementing at least one dry blending step of components (a) to (e).

This use is also characterized in that the chlorinated and filled thermoplastic composition is formed by a process implementing at least one transformation step by extrusion or injection moulding.

This use is also in that the said chlorinated and filled thermoplastic composition is formed by a process implementing at least one step at a temperature between 150 and 250° C., and preferentially between 180 and 220° C.

Another object of the invention is a manufacturing process for a chlorinated and filled thermoplastic composition containing at least one chlorinated thermoplastic resin and at least one mineral filler including:

a) at least one grinding step of the said mineral filler,
b) followed by at least one step of incorporating in the thermoplastic resin the ground mineral filler obtained in step a).

characterized in that it implements in the course of step a) a linear amphiphilic copolymer:

consisting of at least one hydrophilic monomer and at least one hydrophobic monomer, and having an average molar mass by weight of between 5,000 g/mol and 20,000 g/mol and a polymolecularity index less than or equal to 3, and preferentially an average molar mass by weight of between 10,000 g/mol and 15,000 g/mol, and a polymolecularity index less than or equal to 2.5.

This process is also characterized in that the said amphiphilic copolymer contains, in mole % of each monomer, between 60% and 95% of hydrophilic monomer and 5% to 40% of hydrophobic monomer, preferentially between 70% and 90% of hydrophilic monomer and 10% to 30% of hydrophobic monomer.

This process is also characterized in that the hydrophilic comonomer is chosen from among acrylic acid, methacrylic acid and the blends of these monomers.

This process is also characterized in that the hydrophobic comonomer is chosen from among the styrenes and the alkyl acrylates and blends thereof, including more specifically butyl styrene and butyl acrylate.

This process is also characterized in that the said linear amphiphilic copolymer has a random structure or a block structure.

This process is also characterized in that the chlorinated and filled thermoplastic composition contains, in relation to its total weight:
(a) from 0.1 to 99% by dry weight of at least one chlorinated thermoplastic resin,
(b) from 0.1 to 90%, preferentially from 5 to 50% by dry weight of at least one mineral filler.
(c) from 0.01 to 5%, preferentially from 0.1 to 3% by dry weight of the said linear amphiphilic copolymer,
(d) from 0 to 20%, preferentially from 5 to 20% by dry weight of a heat stabilizer and/or a UV stabilizer and/or a lubricant and/or a rheology modifier and/or an impact modifier and/or a processability agent that is not the said amphiphilic copolymer,
(e) from 0 to 3%, preferentially from 0 to 1%, very preferentially from 0 to 0.5%, extremely preferentially from 0 to 0.2% by dry weight with respect to the dry weight of the mineral filler, of a compatibilizer other than the said amphiphilic copolymer, this compatibilizer being preferentially a fatty acid with from 8 to 20 carbon atoms, the said acid being preferentially selected from among stearic acid and its salts.

This process is also characterized in that the chlorinated thermoplastic resin is chosen from among PVC, chlorinated polyvinyl chloride (CPVC), chlorinated polyethylene, copolymers of the PVC-polyvinyl acetate (PVC-PVAC) type and blends thereof.

This process is also characterized in that the mineral filler is chosen from among natural or synthetic calcium carbonate, the dolomites, limestone, kaolin, talc and blends thereof, and is a preferentially a natural or synthetic calcium carbonate.

This process is also characterized in that step a) is a dry grinding step or a wet grinding step followed by a drying, and preferentially of a wet grinding of the said mineral filler followed by a drying.

This process is also characterized in that the said mineral filler has an average diameter measured by a Sedigraph™ 5100 of between 0.5 and 5 µm, and preferentially between 0.6 µm and 1.5 µm.

This process is also characterized in that the said mineral filler has a percentage by weight of particles with a diameter less than 2 µm, as measured by a Sedigraph™ 5100 ranging between 10% and 99%, preferentially between 50% and 95%, and more preferentially between 60% and 90%.

This process is also characterized in that step b) is followed by at least one step c) of transformation by extrusion or by injection moulding.

This process is also characterized in that step c) is conducted at a temperature between 150 and 250° C. and preferentially between 180 and 220° C.

A final object of the invention consists of a chlorinated and filled thermoplastic composition obtained by the process according to the invention.

The scope and interest of the invention will be best be seen through the following examples which are not limiting.

EXAMPLES

In all the examples, the mean molar mass by weight, designated Mw and the polymolecularity index, designated PI, are determined.

according to the method described in document WO 02/070571 for linear copolymers.

and according to the method described in document WO 2008/107787 for comb-type copolymers.

Example 1

This example illustrates the manufacture of PVC based and calcium carbonate-containing compositions for which the resistance to impact, the gloss, the thermal stability and the UV resistance in different hypothetical cases have been measured:

in the absence of a compatibilizer (test No. 1), in the presence of a compatibilizer which is a comb-type polymer according to the prior art (tests No. 2 and 3).

in the presence of a comb amphiphilic copolymer (tests No. 4 to 7), in the presence of a linear amphiphilic copolymer which does not present the characteristics of the molecular weight and polymolecularity index of the invention (test No. 8), in the presence of a linear amphiphilic copolymer which presents the characteristics of molecular weight and polymolecularity index of the invention (tests No. 9 to 13).

Composition of Filled PVCs:

2,200 grams of a PVC resin marketed by the ARKEMA™ company under the name Lacovyl™ S110P 110 grams of titanium dioxide marketed by the KRONOS™ company under the name Kronos™ 2200

132 grams of an organic shock modifying additive of the core-shell type marketed by the ARKEMA™ company under the name Durastrength™ 320

55 grams of a heat stabilizer marketed by the BARLOCHER™ company under the name One Pack Baeropan™

1.1 grams of a lubricant marketed by the LAPASSE ADDITIVES CHEMICALS™ company under the name Lacowax™ EP 352 grams of calcium carbonate in powder form resulting from the drying of Hydrocarb 90 OG marketed by the OMYA™ company.

Obtaining the Dry Powders of Calcium Carbonate

The suspension referred to as Hydrocarb 90 OG is a limestone suspension with a percentage by weight of particles with a diameter less than 2 µm, as measured by a Sedigraph™ 5100, of 90% and an average diameter measured by a Sedigraph™ 5100 of 0.7 µm.

The Hydrocarb 90 OG product was dried by means of spray dryer of the Niro Minor Mobile 2000 type marketed by the NIRO™ company. The characteristics of this drying are:
gas inlet temperature: 350° C.
gas outlet temperature: 102-105° C.
ventilation open to 99%
air pressure: 4 bar Drying is carried out in the presence of, expressed with respect to the dry weight of calcium carbonate:
0.90% by dry weight of stearic acid,
and 0.45% by dry weight of stearic acid when there is a compatibilizer according to the prior art, or according to the invention, 0.7% by dry weight of the said agent thus being used.

Manufacture of Dry PVC Blends

For each test, it begins with the preparation of the blend of the different constituents that make up the composition of chlorinated thermoplastic materials. Such blends are produced according to methods that are well known to the person skilled in the art.

Extrusion of Dry Blends of PVC

All the dry blends were extruded with a Thermoelectron Polylab™ 600 610 P system equipped with a twin-screw and a flat film dye (25 mm×3 mm).

The PVC profiles are then calibrated at 15° C. in a water bath and laminated on a Yvroud system. The extrusion parameters are:
temperature of the 4 zones: 170° C.
speed of the screws: 30 RPM Measurements of Impact Strengths The measurements of impact strengths are carried out according to the British Standard BS 7413: 2003. The measurements were averaged over batches of 10 test pieces manufactured with the Diadisc™ 4200 machine marketed by the MUTRONIC™ company.

This parameter will be designated as "impact" and expressed in $kJ/m^2$.

Measurements of Gloss

The gloss measurements were carried out at 60° using a Tri-Gloss spectrophotometer marketed by the BYK-GARDNER™ company.

This parameter will be designated as "gloss 60" and is dimensionless.

Measurement of Thermal Stability

The phenomenon of thermal stability is determined by means of 2 different methods. The first is based on the CHD, the second on the gelling curves.

The CHD measurement enables a determination of the speed of dehydrochloration of the PVC samples at 200° C. It is representative of the thermal stability of these samples. Samples of approximately 0.5 g of PVC are placed in a Metrohm 763 PVC Thermomat type apparatus at 200° C. The quantity of HCL vapour released by the samples is introduced into a 60 ml solution of bipermuted water in which the evolution of conductivity is followed. The stabilization time, designated as "$t_{DHC}$" (min.), is the time starting from which the conductivity of aqueous solution reaches a value of 50 µS/cm. This greater this time is, the better is the stability of the samples.

The gelling curves are produced for dry blends of PVC which are subjected to a special heat treatment. These dry blends of PVC are placed in an internal blender (Thermoelectron Rheomix 600 610P) with the following parameters:
speed of 30 RPM,
temperature of 190° C.
volume of 69 $cm^3$.

A curve is traced of the blender torque as a function of time. This curve enables a display of the evolution of the PVC dry blend viscosity over time at a temperature of 190° C. In this sense, and unlike the part referred to as "extrusion of dry blends of PVC" the Thermoelectron device is used as a blender: the said dry blends of PVC are subjected to a certain heat treatment during which the evolution of the said blend's viscosity is followed.

After an initial period of increase in the viscosity of the PVC dry blend, followed by a sharp decrease that corresponds to the PVC gelling phase, there is then a torque stabilization phase of up to about 10 minutes that corresponds to the normal extrusion phase of this material. Then, depending on the characteristics of the processed filler, a new evolution of the internal blender torque is observed that corresponds to the thermal degradation of the PVC material. After 16 minutes, the PVC formulations that will be greatly degraded can be distinguished appreciably from those that will be remain stable. The value of the torque at this point in time is measured, designated as "torque" (N·m2). The lower this value is, the better is the stability of the blend.

Measurement of Pinking

The phenomenon of pinking is determined through the measurement of parameter "a" (measurement of red, in the well-known benchmark coordinates L, a b) on the samples of PVC coming directly from the extruder and cut into 20×0.9 cm strips (the extrusion parameters having been indicated above).

This parameter will simply be designated as "a". The weaker it is, the more pinking is attenuated.

It is also determined through the variation in "a", after having exposed the PVC samples from the extruder, cut in strips of 20×0.9 cm, to mercury lamps (200-450 nm) for 500 hours at 60° C. in a 12/24 Sepap enclosure.

This parameter will be designated as "$\Delta a_{UV}$". The greater it is, the closer the colour of the sample is to pink.

The polymers used are listed in the following pages and the applicable results are summarized in table 1.

Test No. 1

This test constitutes a reference and does not use a compatibilizer.

Test No. 2

This test demonstrates the prior art and uses a comb polymer constituted by weight of:
82.0% acrylic acid,
18.0% methoxy polyethylene glycol methacrylate (Mw=5,000 g/mole),
with a Mw=65,000 g/mol and a PI=2.8.

Test No. 3

This test demonstrates the prior art and uses a comb polymer constituted by weight of:
84.0% methacrylic acid,
16.0% hydroxy polyalkylene glycol methacrylate (Mw=3,000 g/mole),
with a Mw=65,000 g/mol and a PI=2.8.

Test No. 4

This test demonstrates the invention and uses a block amphiphilic copolymer of acrylic acid/methoxy polyethylene glycol methacrylate (Mw=2,000 g/mol) with a hydrophobic comonomer (butyl acrylate) in water. The amphiphilic copolymer poly((AA-co-MEPEGM 2000)-block-BAc) is constituted in moles of:
- 55.1% acrylic acid,
- 22.8% methoxy polyethylene glycol methacrylate (Mw=2,000 g/mole),
- 22.1% butyl acrylate, with a Mw=33,800 g/mol and a PI=3.93.

Into a 2 L reactor equipped with mechanical stirring and oil bath type heating are introduced 600 g of water and 37.05 g of the formula transfer agent (I) (M designating the sodium cation) at 21.70% in water.

Under agitation, the synthesis reactor is then heated to a temperature of 65° C., and the following 3 solutions are introduced in parallel over 1 hour:
- 22.5 g of butyl acrylate,
- an aqueous solution consisting of 6.45 g of $Na_2S_2O_8$ and 75 g of water,
- an aqueous solution consisting of 1.95 g of $Na_2S_2O_5$ and 75 g of water, Still under agitation, the following 3 solutions are then introduced in parallel at 65° C. over 1.5 hours:
- 31.5 g of acrylic acid and 360 g of methoxy polyethylene glycol methacrylate with Mw=2,000 g/mol diluted in 240 g of water,
- an aqueous solution consisting of 3.75 g of $Na_2S_2O_8$ and 37.5 g of water,
- an aqueous solution consisting of 1.05 g of $Na_2S_2O_5$ and 37.5 g of water.

After treatment with an aqueous solution of hydrogen peroxide (0.92 g $H_2O_2$ at 35% in 15 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid and methoxy polyethylene glycol methacrylate 2000 with butyl acrylate, a hydrophobic comonomer.

Test No. 5

This test demonstrates the invention and uses a block amphiphilic copolymer of acrylic acid/methoxy polyethylene glycol methacrylate (Mw=2,000 g/mol) with a hydrophobic comonomer (styrene) in water. The amphiphilic copolymer poly((AA-co-MEPEGM 2000)-block-Sty) is constituted in moles of:
- 55.1% acrylic acid,
- 22.7% methoxy polyethylene glycol methacrylate (Mw=2,000 g/mole),
- 22.2% styrene, with a Mw=23,100 g/mol and a PI=3.32.

Into a 2 L reactor equipped with mechanical stirring and oil bath type heating are introduced 600 g of water and 37.05 g of the formula transfer agent (I) (M designating the sodium cation) at 21.70% in water.

Under agitation, the synthesis reactor is then heated to a temperature of 65° C., and the following 3 solutions are introduced in parallel over 1 hour:
- 18.30 g of styrene,
- an aqueous solution consisting of 6.45 g of $Na_2S_2O_8$ and 75 g of water,
- an aqueous solution consisting of 1.95 g of $Na_2S_2O_5$ and 75 g of water, Still under agitation, the following 3 solutions are then introduced in parallel at 65° C. over 1.5 hours:
- 31.5 g of acrylic acid and 360 g of methoxy polyethylene glycol methacrylate (Mw=2,000 g/mole) diluted in 240 g of water,
- an aqueous solution consisting of 3.75 g of $Na_2S_2O_8$ and 37.5 g of water,
- an aqueous solution consisting of 1.05 g of $Na_2S_2O_5$ and 37.5 g of water.

After treatment with an aqueous solution of hydrogen peroxide (0.92 g $H_2O_2$ at 35% in 15 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid and methoxy polyethylene glycol methacrylate 2000 with styrene, a hydrophobic comonomer.

Test No. 6

This test demonstrates the invention and uses a block amphiphilic copolymer of acrylic acid/methoxy polyethylene glycol methacrylate (Mw=5,000 g/mol) with a hydrophobic comonomer (styrene) in water. The amphiphilic copolymer poly((AA-co-MEPEGM 5000)-block-Sty) is constituted in moles of:
- 55.2% acrylic acid,
- 22.7% methoxy polyethylene glycol methacrylate (Mw=5,000 g/mole),
- 22.1% styrene, with a Mw=29,400 g/mol and a PI=2.63.

Into a 2 L reactor equipped with mechanical stirring and oil bath type heating are introduced 600 g of water and 37.05 g of the formula transfer agent (I) (M designating the sodium cation) at 21.70% in water.

Under agitation, the synthesis reactor is then heated to a temperature of 65° C., and the following 3 solutions are introduced in parallel over 1 hour:
- 18.24 g of styrene,
- an aqueous solution consisting of 6.45 g of $Na_2S_2O_8$ and 75 g of water,
- an aqueous solution consisting of 1.95 g of $Na_2S_2O_5$ and 75 g of water.

Still under agitation, the following 3 solutions are then introduced in parallel at 65° C. over 1.5 hours:
- 31.5 g of acrylic acid and 360 g of methoxy polyethylene glycol methacrylate (Mw=5,000 g/mole) diluted in 240 g of water,
- an aqueous solution consisting of 3.75 g of $Na_2S_2O_8$ and 37.5 g of water,
- an aqueous solution consisting of 1.05 g of $Na_2S_2O_5$ and 37.5 g of water.

After treatment with an aqueous solution of hydrogen peroxide (0.92 g H2O2 at 35% in 15 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid and methoxy polyethylene glycol methacrylate 5000 with styrene, a hydrophobic comonomer.

Test No. 7

This test demonstrates the invention and uses a block amphiphilic copolymer of acrylic acid/methoxy polyethylene glycol methacrylate (Mw=5,000 g/mol) with a hydrophobic comonomer (butyl acrylate) in water. The amphiphilic copolymer poly((AA-co-MEPEGM 5000)-block-BAc) is constituted in moles of:
- 55.2% acrylic acid,
- 22.7% methoxy polyethylene glycol methacrylate (Mw=5,000 g/mole),
- 22.1% butyl acrylate, with a Mw=51,800 g/mol and a PI=3.39.

Into a 2 L reactor equipped with mechanical stirring and oil bath type heating are introduced 600 g of water and 37.05 g of the formula transfer agent (I) (M designating the sodium cation) at 21.70% in water.

Under agitation, the synthesis reactor is then heated to a temperature of 65° C., and the following 3 solutions are introduced in parallel over 1 hour:
  22.50 g of butyl acrylate,
  an aqueous solution consisting of 6.45 g of $Na_2S_2O_8$ and 75 g of water,
  an aqueous solution consisting of 1.95 g of $Na_2S_2O_5$ and 75 g of water.

Still under agitation, the following 3 solutions are then introduced in parallel at 65° C. over 1.5 hours:
  31.5 g of acrylic acid and 360 g of methoxy polyethylene glycol methacrylate (Mw=5,000 g/mole) diluted in 240 g of water,
  an aqueous solution consisting of 3.75 g of $Na_2S_2O_8$ and 37.5 g of water,
  an aqueous solution consisting of 1.05 g of $Na_2S_2O_5$ and 37.5 g of water.

After treatment with an aqueous solution of hydrogen peroxide (0.92 g $H_2O_2$ at 35% in 15 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid and methoxy polyethylene glycol methacrylate 5000 with butyl acrylate, a hydrophobic comonomer.

Test No. 8

This test is non-invention and uses a random amphiphilic copolymer of acrylic acid with hydrophobic comonomers (butyl acrylate), in water. The amphiphilic copolymer poly(AA-co-BAc) is constituted in moles of:
  9.0.0% acrylic acid,
  10.0% butyl acrylate,
with a Mw=12,000 g/mol and a PI=3.4.

Into a 2 L reactor equipped with mechanical stirring and oil bath type heating are introduced 219.6 g of water and 293.43 g of isopropanol and 1.4 g of AZDN.

Under agitation, the synthesis reactor is then heated under reflux, and 226.96 g of acrylic acid, 44.84 g of butyl acrylate and 175.2 g of water are introduced over 2 hours. The medium is then distilled (removal of isopropanol) and neutralized with sodium hydroxide until the pH=12.8. A stable solution in water is obtained containing the "conventional" sodium neutralized random copolymer of acrylic acid with butyl acrylate, a hydrophobic comonomer.

Test No. 9

This test demonstrates the invention and uses a block amphiphilic copolymer of acrylic acid with a hydrophobic comonomer (styrene) in water. The amphiphilic copolymer poly(AA-block-Sty) is constituted in moles of:
  90.0% acrylic acid,
  10.0% styrene,
with a Mw=9,600 g/mol and a PI=2.0.

Into a 2 L reactor equipped with mechanical stirring and oil bath type heating are introduced 600 g of water and 83.1 g of the formula transfer agent (I) (M designating the sodium cation) at 21.70% in water.

Under agitation, the synthesis reactor is then heated to a temperature of 65° C., and the following 3 solutions are introduced in parallel over 1 hour:
  17.25 g of styrene,
  an aqueous solution consisting of 12.90 g of $Na_2S_2O_8$ and 150 g of water,
  an aqueous solution consisting of 3.90 g of $Na_2S_2O_5$ and 150 g of water.

Still under agitation, the following 3 solutions are then introduced in parallel at 65° C. over 1.5 hours:
  105 g of acrylic acid diluted in 75 g of water,
  an aqueous solution consisting of 1.5 g of $Na_2S_2O_8$ and 75 g of water,
  an aqueous solution consisting of 0.42 g of $Na_2S_2O_5$ and 75 g of water.

After treatment with an aqueous solution of hydrogen peroxide (1.83 g $H_2O_2$ at 35% in 15 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid with styrene, a hydrophobic comonomer.

Test No. 10

This test demonstrates the invention and uses a block amphiphilic copolymer of acrylic acid with a hydrophobic comonomer (butyl acrylate) in water. The amphiphilic copolymer poly(AA-block-BAc) is constituted in moles of:
  90.0% acrylic acid,
  10.0% butyl acrylate,
with a Mw=14,800 g/mol and a PI=2.5.

Into a 2 L reactor equipped with mechanical stirring and oil bath type heating are introduced 800 g of water and 110.8 g of the formula transfer agent (I) (M designating the sodium cation) at 19.35% in water.

Under agitation, the synthesis reactor is then heated to a temperature of 65° C., and the following 3 solutions are introduced in parallel over 1 hour:
  30 g of butyl acrylate,
  an aqueous solution consisting of 17.2 g of $Na_2S_2O_8$ and 100 g of water,
  an aqueous solution consisting of 5.2 g of $Na_2S_2O_5$ and 100 g of water.

Still under agitation, the following 3 solutions are then introduced in parallel at 65° C. over 1.5 hours:
  140 g of acrylic acid diluted in 100 g of water
  an aqueous solution consisting of 2 g of $Na_2S_2O_8$ and 50 g of water
  an aqueous solution consisting of 0.56 g of $Na_2S_2O_5$ and 50 g of water After treatment with an aqueous solution of hydrogen peroxide (1.2 g $H_2O_2$ at 35% in 20 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid with butyl acrylate, a hydrophobic comonomer.

Test No. 11

This test demonstrates the invention and uses a block amphiphilic copolymer of acrylic acid with a hydrophobic comonomer (butyl acrylate) in water. The amphiphilic copolymer poly(AA-block-BAc) is constituted in moles of:
  80.0% acrylic acid,
  20.0% butyl acrylate,
with a Mw=8,600 g/mol and a PI=2.3.

Into a 2 L reactor equipped with mechanical stirring and oil bath type heating are introduced 800 g of water and 368.81 g of the formula transfer agent (I) (M designating the sodium cation) at 21.70% in water.

Under agitation, the synthesis reactor is then heated to a temperature of 65° C., and the following 3 solutions are introduced in parallel over 1 hour:

56.6 g of butyl acrylate,
an aqueous solution consisting of 51.6 g of $Na_2S_2O_8$ and 150 g of water,
an aqueous solution consisting of 15.6 g of $Na_2S_2O_5$ and 100 g of water.

Still under agitation, the following 3 solutions are then introduced in parallel at 65° C. over 1.5 hours:
125.3 g of acrylic acid diluted in 114 g of water,
an aqueous solution consisting of 6 g of $Na_2S_2O_8$ and 50 g of water,
an aqueous solution consisting of 1.68 g of $Na_2S_2O_5$ and 50 g of water.

After treatment with an aqueous solution of hydrogen peroxide (3.6 g $H_2O_2$ at 35% in 20 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid with butyl acrylate, a hydrophobic comonomer.

Test No. 12

This test demonstrates the invention and uses a block amphiphilic copolymer of acrylic acid with hydrophobic comonomers (butyl acrylate and stearyl methacrylate) in water. The amphiphilic copolymer poly(AA-block-(BAc-co-Stearyl Meth)) is constituted in moles of:
80.0% acrylic acid,
10% butyl acrylate,
10% stearyl methacrylate,
with a Mw=12,600 g/mol and a PI=2.3.

Into a 2 L reactor equipped with mechanical stirring and oil bath type heating are introduced 800 g of water and 123.22 g of the formula transfer agent (I) (M designating the sodium cation) at 21.70% in water.

Under agitation, the synthesis reactor is then heated to a temperature of 65° C., and the following 3 solutions are introduced in parallel over 1 hour:
28 g of butyl acrylate and 74.86 g of stearyl methacrylate,
an aqueous solution consisting of 17.2 g of $Na_2S_2O_8$ and 100 g of water,
an aqueous solution consisting of 5.2 g of $Na_2S_2O_5$ and 100 g of water.

Still under agitation, the following 3 solutions are then introduced in parallel at 65° C. over 1.5 hours:
125.3 g of acrylic acid diluted in 114 g of water
an aqueous solution consisting of 2 g of $Na_2S_2O_8$ and 50 g of water
an aqueous solution consisting of 0.56 g of $Na_2S_2O_5$ and 50 g of water After treatment with an aqueous solution of hydrogen peroxide (1.2 g $H_2O_2$ at 35% in 20 g of water), the resulting solution is then neutralized at 90° C. with sodium hydroxide to a pH=12. A final post treatment with $Na_2S_2O_8$ is carried out. A stable solution in water is obtained containing the sodium neutralized block copolymer of acrylic acid with butyl acrylate and stearyl methacrylate, hydrophobic comonomers.

Test No. 13

This test demonstrates the invention and uses the synthesis of a random structure amphiphilic copolymer and at controlled PI, acrylic acid with a hydrophobic comonomer (butyl acrylate) in water. The amphiphilic copolymer poly(AA-co-BAc) is constituted in moles of:
90.0% acrylic acid,
10% butyl acrylate,
with a Mw=12,700 g/mol and a PI=2.5.

Into a 2 L reactor equipped with mechanical stirring and oil bath type heating are introduced 500 g of water and 57.75 g of the formula transfer agent (I) (M designating the sodium cation) at 21.70% in water.

Under agitation, the synthesis reactor is then heated to a temperature of 90° C., and the following 3 solutions are introduced in parallel over 1.5 hours:
315.9 g of acrylic acid, 62.4 g of butyl acrylate and 72.1 g of water,
an aqueous solution consisting of 31.32 g of $Na_2S_2O_8$ and 100 g of water,
an aqueous solution consisting of 8.93 g of $Na_2S_2O_5$ and 100 g of water.

After treatment with an aqueous solution of hydrogen peroxide (1.2 g $H_2O_2$ at 35% in 20 g of water), the resulting solution is then neutralized at 90° C. with sodium hydroxide to a pH=12. A final post treatment with $Na_2S_2O_8$ is carried out. A stable solution in water is obtained containing the sodium neutralized PI controlled copolymer of acrylic acid with butyl acrylate, a hydrophobic comonomer.

TABLE 1

| | REF/PA/OI/IN | | | | | | |
|---|---|---|---|---|---|---|---|
| | REF | PA | PA | OI | OI | OI | OI |
| | | | | Test No. | | | |
| | 1 | 2 | 3 | 4 | 5 | 6 | 7 |
| | | | | Polymer structure | | | |
| | | comb | comb | amphi comb | amphi comb | amphi comb | amphi comb |
| PA | | 82.0 | | 55.1 | 55.1 | 55.2 | 55.2 |
| AMA | | | 84.0 | | | | |
| MEPEGM2000 | | | | 22.7 | 22.7 | | |
| MEPEGM5000 | | 18.0 | | | | 22.7 | 22.7 |
| HYPAGM3000 | | | 16.0 | | | | |
| BAc | | | | 22.7 | | | 22.1 |
| styrene | | | | | 22.2 | 22.1 | |
| mstearyl | | | | | | | |
| Mw | | | | 33,800 | 23,100 | 29,400 | 51,800 |
| PI | | | | 3.93 | 3.32 | 2.63 | 3.39 |
| impact | 22.2 | 23.2 | 23.6 | 25.3 | 25.8 | 25.5 | 24.1 |
| gloss 60 | 37.5 | 46.1 | 51.4 | 52.0 | 49.1 | 52.1 | 50.9 |
| $t_{DHC}$ (min.) | 45.6 | 45.4 | 47.0 | 46.7 | 46.2 | 42.9 | 42.9 |
| torque (N · m2) | 21.5 | 26.2 | 23.3 | 24.8 | 23.4 | 27.0 | 23.5 |

TABLE 1-continued

| | | | | | | |
|---|---|---|---|---|---|---|
| pinking a | 5.4 | 9.4 | 7.0 | 9.1 | 8.5 | 8.1 | 8.2 |
| pinking $\Delta a_{UV}$ | 3.8 | 4.2 | 3.5 | 4.6 | 3.6 | 3.7 | 4.3 |

| | REF/PA/OI/IN | | | | | |
|---|---|---|---|---|---|---|
| | OI | IN | IN | IN | IN | IN |
| | | | Test No. | | | |
| | 8 | 9 | 10 | 11 | 12 | 13 |
| | | | polymer | | | |
| | amphi random | amphi block | amphi block | amphi block | amphi block | amphi random |
| PA | 90 | 90 | 90 | 80 | 80 | 90 |
| AMA | | | | | | |
| MEPEGM2000 | | | | | | |
| MEPEGM5000 | | | | | | |
| HYPAGM3000 | | | | | | |
| BAc | | | 10 | 20 | 10 | 10 |
| styrene | 10 | 10 | | | | |
| mstearyl | | | | | 10 | |
| Mw | 12,000 | 9,600 | 14,800 | 8,600 | 12,600 | 12,700 |
| PI | 3.4 | 2 | 2.5 | 2.3 | 2.3 | 2.5 |
| impact | 25.0 | 25.1 | 24.5 | 24.7 | 25.0 | 25.4 |
| gloss 60 | 51.0 | 52.3 | 52.4 | 53.1 | 53.1 | 53.9 |
| $t_{DHC}$ (min.) | 45.0 | 49.8 | 48.0 | 49.2 | 49.5 | 54.6 |
| torque (N · m2) | 23.7 | 19.8 | 20.5 | 21.6 | 20.7 | 21.4 |
| pinking a | 7.5 | 4.4 | 3.5 | 3.9 | 3.5 | 3.2 |
| pinking $\Delta a_{UV}$ | 4.0 | 2.8 | 2.9 | 3.0 | 2.9 | 2.6 |

Table 1 indicates what the following abbreviations designate (the others being obvious or already clarified):
REF: reference
PA: Prior Art
OI: Off Invention
IN: Invention
MEPEGM2000: methoxy polyethylene glycol methacrylate (Mw=2,000 g/mole)
MEPEGM5000: methoxy polyethylene glycol methacrylate (Mw=5,000 g/mole)
HYPAGM3000: hydroxy polyalkylene glycol methacrylate (Mw=3,000 g/mole)

In the first place, a reading of this table demonstrates the positive influence of the compatibilizer (whatever it is) on the resistance to impact and the gloss of the samples. This agent plays its compatibilizing role between the filler and the resin, improving the dispersion of the first within the second: the mechanical properties of resistance to impact and gloss are improved, as expected.

At the level of the thermal stability of the samples, it is apparent that the non-amphiphilic comb polymer according to test No. 3—which belongs to the prior art—is higher performing than its counterpart according to test No. 2, which was expected: it is precisely for this heat stabilizer function that the polymer according to test No. 3 was claimed in the still unpublished French patent application bearing number FR 08 58748). In addition, it is apparent that this non-amphiphilic comb polymer leads to an improved thermal stability compared to the values obtained with amphiphilic comb copolymers out of the invention. It is truly the amphiphilic linear copolymers according to the invention that lead to better results: a greatly improved thermal stability, both from the viewpoint of the CHD as from that of the gelling curves.

Finally, as regards pinking, it is undoubtedly the copolymers according to the invention that lead to better results. In summary, these polymers do not alter the compatibility of the mineral filler with the resin (retention of the properties of resistance to impact and gloss), but they significantly improve the thermal stability of all filled materials while reducing their tendency to pinking.

The invention claimed is:

1. A method of improving thermal stability and UV resistance of a chlorinated and filled thermoplastic composition comprising at least one chlorinated thermoplastic resin and at least one mineral filler, the method comprising incorporating an agent comprising a linear amphiphilic copolymer into the chlorinated and filled thermoplastic composition, wherein the linear amphiphilic copolymer (i) consists of at least one hydrophilic monomer and at least one hydrophobic monomer, (ii) has a weight average molecular weight of between 5,000 g/mol and 20,000 g/mol, and (iii) a polydispersity index of less than or equal to 3.

2. The method according to claim 1, wherein the linear amphiphilic copolymer has a weight average molecular weight of between 10,000 g/mol and 15,000 g/mol, and a polydispersity index of less than or equal to 2.5.

3. The method according to claim 1, wherein the linear amphiphilic copolymer contains 60% to 95% of the hydrophilic monomer and 5% to 40% of hydrophobic monomer, based on the total mole percent of monomers.

4. The method according to claim 1, wherein the hydrophilic monomer is acrylic acid, methacrylic acid or a blend thereof.

5. The method according to claim 1, wherein the hydrophobic monomer is a styrene, an alkyl acrylate or a blend thereof.

6. The method according to claim 1, wherein the hydrophobic monomer comprises styrene, butyl acrylate or a blend thereof.

7. The method according to claim 1, wherein the linear amphiphilic copolymer has a random structure or a block structure.

8. The method according to claim 1, wherein the chlorinated and filled thermoplastic composition contains:

(a) from 0.1 to 99% by dry weight of at least one chlorinated thermoplastic resin, based on the total weight of the chlorinated and filled thermoplastic composition, (b) from 0.1 to 90% by dry weight of at least one mineral filler, based on the total weight of the chlorinated and filled thermoplastic composition, (c) from 0.01 to 5% by dry weight of the said linear amphiphilic copolymer, based on the total weight of the chlorinated and filled thermoplastic composition, (d) from 0 to 20% by dry weight of a heat stabilizer and/or a UV stabilizer and/or a lubricant and/or a rheology modifier and/or an impact modifier and/or a processability agent that is not the said amphiphilic copolymer, based on the total weight of the chlorinated and filled thermoplastic composition, and (e) from 0 to 3% by dry weight with respect to the dry weight of the mineral filler, of a compatibilizer other than the amphiphilic copolymer.

9. The method according to claim 1, wherein the chlorinated and filled thermoplastic composition contains:

(a) from 0.1 to 99% by dry weight of at least one chlorinated thermoplastic resin based, on the total weight of the chlorinated and filled thermoplastic composition, (b) from 5 to 50% by dry weight of at least one mineral filler, based on the total weight of the chlorinated and filled thermoplastic composition, (c) from 0.1 to 3% by dry weight of the said linear amphiphilic copolymer, based on the total weight of the chlorinated and filled thermoplastic composition, (d) from 5 to 20% by dry weight of a heat stabilizer and/or a UV stabilizer and/or a lubricant and/or a rheology modifier and/or an impact modifier and/or a processability agent that is not the said amphiphilic copolymer, based on the total weight of the chlorinated and filled thermoplastic composition, (e) from 0 to 1% by dry weight with respect to the dry weight of the mineral filler, of a compatibilizer other than the said amphiphilic copolymer.

10. The method according to claim 9, wherein the chlorinated and filled thermoplastic composition contains in (e) from 0 to 0.5% by dry weight with respect to the dry weight of the mineral filler, of a compatibilizer other than the said amphiphilic copolymer.

11. The method according to claim 8, wherein compatibilizer is a fatty acid with from 8 to 20 carbon atoms.

12. The method according to claim 9, wherein compatibilizer is a fatty acid with from 8 to 20 carbon atoms.

13. The method according to claim 8, wherein compatibilizer is stearic acid or a salt thereof.

14. The method according to claim 9, wherein compatibilizer is stearic acid or a salt thereof.

15. The method according to claim 1, wherein the chlorinated thermoplastic resin is PVC, chlorinated polyvinyl chloride (CPVC), chlorinated polyethylene, a copolymer of type PVC-polyvinyl acetate (PVC-PVAC), or any blend thereof.

16. The method according to claim 1, wherein the mineral filler is natural or synthetic calcium carbonate, a dolomite, limestone, kaolin, talc or any blend thereof.

17. The method according to claim 1, wherein the mineral filler is a natural or synthetic calcium carbonate.

18. The method according to claim 1, wherein the linear amphiphilic copolymer is incorporated into the chlorinated and filled thermoplastic composition by first grinding the mineral filler in the presence of the linear amphiphilic copolymer followed by drying, and then introducing the dry ground mineral filler and amphiphilic copolymer into the chlorinated thermoplastic resin, wherein the grinding is dry grinding or a wet grinding.

19. The process according to claim 1, wherein the mineral filler has an average diameter measured by a Sedigraph™ 5100 of between 0.5 and 5 µm.

20. The process according to claim 1, wherein the mineral filler has a percentage by weight of particles with a diameter less than 2 µm, as measured by a Sedigraph™ 5100, ranging between 10% and 99%.

21. The process according to claim 8, wherein the chlorinated and filled thermoplastic composition is formed by dry blending components (a) to (e).

22. The process according to claim 9, wherein the chlorinated and filled thermoplastic composition is formed by dry blending components (a) to (e).

23. The process according to claim 1, wherein the chlorinated and filled thermoplastic composition is formed by extrusion or injection moulding.

24. The process according to claim 1, wherein the chlorinated and filled thermoplastic composition is formed at a process temperature of between 150 and 250° C.

* * * * *